US009837219B2

(12) United States Patent
Jefferies

(10) Patent No.: US 9,837,219 B2
(45) Date of Patent: Dec. 5, 2017

(54) SWITCH CONTACT WETTING WITH LOW PEAK INSTANTANEOUS CURRENT DRAW

(71) Applicant: SCHNEIDER ELECTRIC USA, INC., Palatine, IL (US)

(72) Inventor: Kevin Jefferies, Raleigh, NC (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 689 days.

(21) Appl. No.: 14/141,755

(22) Filed: Dec. 27, 2013

(65) Prior Publication Data

US 2015/0187519 A1 Jul. 2, 2015

(51) Int. Cl.
*H02M 3/06* (2006.01)
*H01H 1/60* (2006.01)
*H01H 9/16* (2006.01)

(52) U.S. Cl.
CPC ............ *H01H 1/605* (2013.01); *H01H 9/167* (2013.01)

(58) Field of Classification Search
CPC ...... H01H 1/605; H01H 1/60; Y10T 307/845; G01R 31/327
See application file for complete search history.

(56) References Cited

U.S. PATENT DOCUMENTS 3,281,829 A 10/1966 Baumgartner
4,745,262 A * 5/1988 Larsen .................... A47J 27/62 219/492
5,729,167 A 3/1998 Kujawa et al.
6,600,242 B1 * 7/2003 Dennison ............... H01H 1/605 200/1 R
6,800,965 B1 * 10/2004 Turner ................... H01H 1/605 307/128
7,573,360 B2 * 8/2009 Bryan .................... H01H 1/605 335/201
2002/0093303 A1 * 7/2002 Lo .......................... G05B 19/18 318/569
2014/0139015 A1 * 5/2014 Poisson .................... H01H 1/60 307/9.1
2014/0251777 A1 * 9/2014 Sadowski ............ H01H 23/205 200/512

FOREIGN PATENT DOCUMENTS

EP 1 079 401 2/2001

* cited by examiner

*Primary Examiner* — Rexford Barnie
*Assistant Examiner* — Rasem Mourad
(74) *Attorney, Agent, or Firm* — Locke Lord LLP

(57) ABSTRACT

A contact wetting circuit 100 is disclosed for supplying wetting current to sense the state of dry contacts of a switch SW1 setting for an electronic device 10. The contact wetting circuit includes an RC circuit 110 having a resistor R1 and a capacitor C1, and a controller 120 connected to a power supply 130 of the device. The controller supplies a first voltage to the RC circuit to produce a charging current having an average current and/or a peak current below the wetting current parameter of the dry contacts. The charging current is used to charge the capacitor C1 during the first time period. The controller stops the supply of the first voltage to the RC circuit after sufficient charging to allow the charged capacitor C1 to supply a second voltage, across the switch SW1, to produce a wetting current. Thereafter, the controller polls and senses the state of the switch SW1, and performs certain operations accordingly.

20 Claims, 4 Drawing Sheets

SWITCH CONTACT WETTING WITH LOW PEAK INSTANTANEOUS CURRENT DRAW

FIELD

The present disclosure relates to the field of dry contacts of a switch used in an electronic device, and more particularly, to a method and circuit for supplying a wetting current to the dry contacts of a switch while reducing power consumption from the power supply of the electronic device.

BACKGROUND

"Dry contacts" include contacts of a type of switch which does not carry power on a normal basis, i.e. not intended to carry power as a part of an operational circuit. Dry contact switches are used in a variety of applications as an input method to an electronic device. For example, dry contacts are used to select settings on switches such as dual-in-line packages (DIP) switches for an electronic device. Dry contact switches are polled with a wetting current to determine their state (e.g., ON or CLOSED and OFF or OPEN) in order to perform certain operations. The wetting current is a current that is used to clean surface oxidation, if present, on the dry contacts of the switch. A wetting current parameter defines a minimum current, for the wetting current, that is necessary for cleaning surface oxidation on the dry contacts of the switch to be properly conductive.

Circuits, such as current sources and multiplexors, are used to supply wetting current for dry contacts, but are costly and consume a significant amount of power. Furthermore, it may not be desirable or even possible to supply wetting current to the dry contacts of a switch directly from the power supply of a low-powered and/or self-powered electronic device. A low-powered electronic device includes devices that draw around tenths of a watt or less of power. A self-powered electronic device includes devices that have a separate power supply which may be used in case of power failure or shut down of the main lines as part of the protective function of the electronic device, to maintain the protective capability of the electronic device in the absence of line power. These types of electronic devices may need to limit the average current consumed when reading or sensing the state of the switch. The terms "read" and "sense" and their derivatives are used interchangeably herein.

For example, a self-powered electronic device, such as a self-powered circuit breaker or motor overload relay, may employ a current transformer (CT) to supply operating current (also known as "supply current") to the device inductively as well as to produce a measurement signal used for polling an operational parameter of the device which is set by the position of the dry contact switch. The electronic device may perform one or more functions, such as load protection (e.g., overcurrent or overload protection), based on the operational parameter. However, measurement error of the measurement signal can be a non-linear function of the power drawn by the electronic device and its components. Thus, if the electronic device draws too much power to produce the wetting current, it may increase the possibility of an erroneous measurement signal, which in turn impacts the functions of the electronic device that depend on the measurement signal.

Accordingly, there is a need to provide a simple and cost effective wetting current circuit for an electronic device.

There is also a need to provide a wetting current circuit that limits or reduces power consumption from a power supply of the electronic device.

SUMMARY

To address these and other shortcomings, a contact wetting circuit and method thereof, particularly useful for a self-powered electronic device, are disclosed for supplying an appropriate wetting current to dry contacts of a switch used in an electronic device, for sensing the state of the switch setting. The contact wetting circuit is able to supply a wetting current for the switch, while limiting an average current or peak current (also known as "peak instantaneous current") drawn from a power supply of the electronic device to below the wetting current parameter of the dry contacts of the switch.

In accordance with an exemplary embodiment, the contact wetting circuit includes a Resistor-Capacitor (RC) circuit and a controller connected to a power supply. The controller is configured to supply a first voltage to the RC circuit during a first time period. The first voltage produces a charging current through the RC circuit. The charging current has an average current or a peak current, which is limited below a wetting current parameter of the dry contacts of the switch. The charging current is used to charge a capacitor of the RC circuit during the first time period. Thereafter, the controller stops supplying the first voltage to the RC circuit, which in turn stops the flow of the charging current through the RC circuit. The capacitor, which is now charged ("charged capacitor"), is then allowed to supply a second voltage across the switch. The second voltage is used to produce a wetting current for the switch during a second time period. After the second time period, the controller senses the state of the switch (e.g., ON or CLOSED position, or OFF or OPEN position) or, in other words, the switch setting. The switch may include one or more switches. The controller may then perform certain operations or functions, according to the state of the switch. The state of the switch may reflect settings for operational modes or parameters of the electronic device. Thus, in addition to controlling the supply of wetting current, the controller may be used in the electronic device to implement other functions or features, depending on the nature or purpose of the electronic device. These functions or features may involve load protection.

The disclosed contact wetting circuit is low in complexity and cost, and does not require the use of active devices, such as current sources and multiplexors which consume a significant amount of power. Furthermore, the contact wetting circuit can be used with motor starters (e.g., DIP switch contact controlled settings in a motor starter control circuit), motor overload relays, circuit breakers, sensors, or other low-powered electronic devices or self-powered electronic devices that include a current transformer (CT) or other energy harvesting system.

To further reduce the complexity of the contact wetting circuit, the controller may interact with the RC circuit and the switch via a single lead, such as a general purpose input output (GPIO) pin. The controller changes the configuration of the GPIO pin to output a high logic level (e.g., 2 volt or 5 volt) to charge the capacitor of the RC circuit, and to receive as input a state of the switch after wetting current is applied to the dry contacts of the switch. After sensing the state of the switch, the controller can set the GPIO pin to output a low logic level, until the next time a switch reading operation is to be performed. In this way, the electronic device can minimize or reduce current consumption.

BRIEF DESCRIPTION OF THE DRAWINGS

The description of the various exemplary embodiments is explained in conjunction with the appended drawings, in which.

DETAILED DESCRIPTION

An exemplary contact wetting circuit and method are disclosed for use in supplying wetting current to dry contacts (e.g., a pair or multiple pairs of dry contacts) of a switch used in an electronic device. As will be described in detail further below in conjunction with FIGS. 1-5, the contact wetting circuit produces a charging current to charge an energy storage device, such as a capacitor, over a time period using power drawn from a power supply for the electronic device. The charging current has an average current and/or a peak current below a wetting current parameter of the dry contacts. The capacitor builds up charge over time. There is eventually sufficient energy stored in the capacitor to create the wetting current. The production of charging current is stopped, and wetting current is available for wetting the dry contacts using power supplied from the charged capacitor. The wetting current may be available before the charging current is stopped. The state of the switch is then sensed. Thereafter, the electronic device may perform functions according to the sensed switch setting. The electronic device can include motor starters, motor overload relays, circuit breakers, sensors, or other low-powered electronic devices and/or self-powered electronic devices that include a current transformer (CT) or other energy harvesting system.

Figure 1:
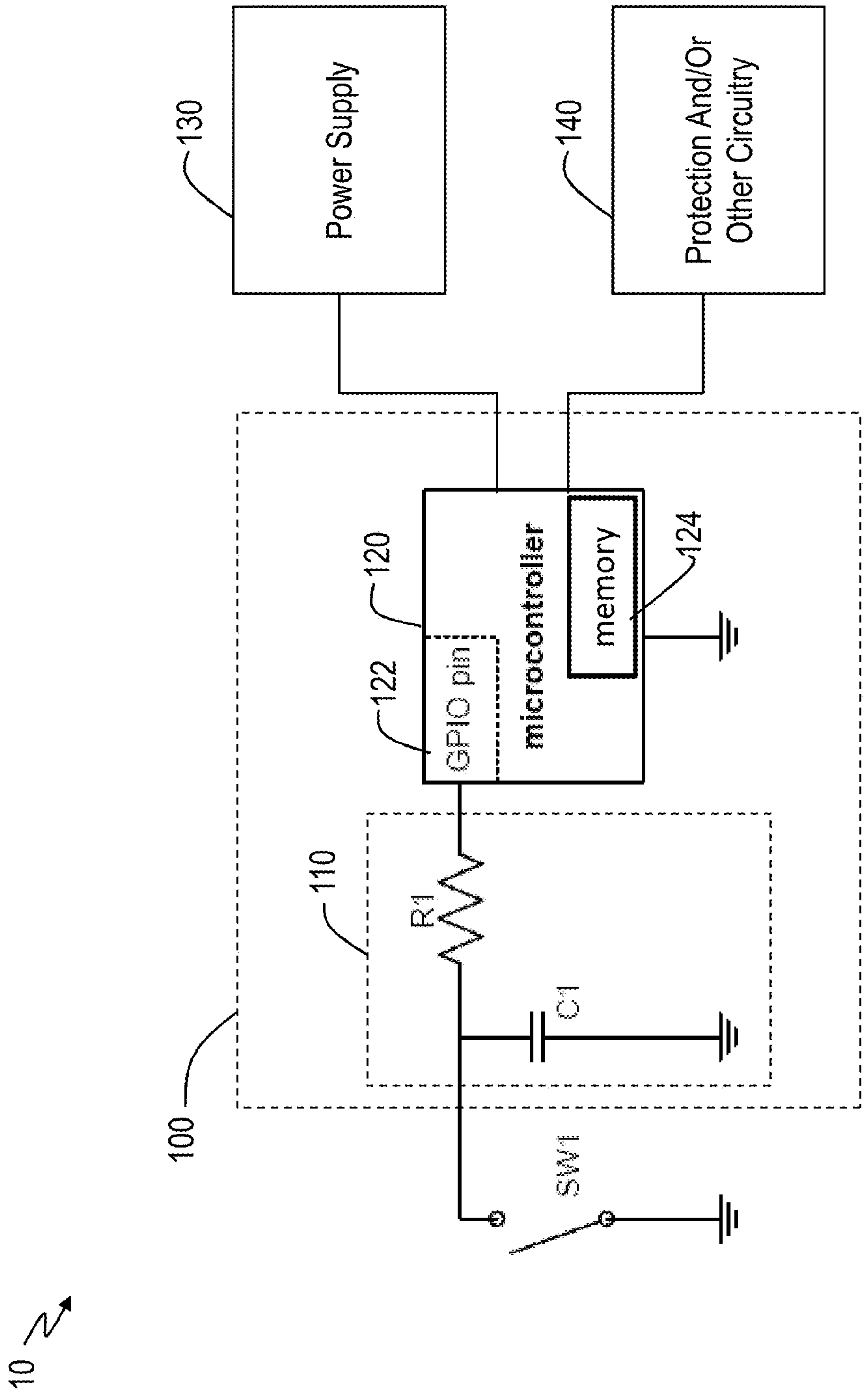
FIG. 1 illustrates a diagram of an electronic device with a contact wetting circuit for supplying wetting current to dry contacts of a switch.

Turning to FIG. 1, an electronic device 10 includes a switch SW1 having dry contacts, a power supply 130 and protection and/or other circuitry 140. The electronic device 10 also includes a contact wetting circuit 100 for supplying wetting current to the switch SW1. The switch SW1 may include one or more switches. The switch SW1 can include a type of switch that does not carry power on a normal basis, i.e. not intended to carry power as a part of an operational circuit. Examples of the switch SW1 can include a DIP switch (e.g., a DIP style toggle switch, rotary-dial switch, sliding switch, etc.) or other types of relays with dry contacts that need to be wetted with a wetting current.

The setting of the switch SW1 may define operational modes or parameters for the electronic device 10. For example, the operational modes or parameters may include: a trip class selection (e.g., a parameter of the trip curve) implemented through a rotary-dial, sliding or toggle switch; a trip current setting implemented through a rotary-dial switch; a setting to enable, disable or configure other functions such as underload protection, undercurrent protection, ground fault protection and automatic reset (all of which are implementable through a toggle switch); a setting for a network communications address; or other settings involving an operation of the electronic device 10.

The contact wetting circuit 100 includes a Resistor-Capacitor (RC) circuit 110 and a controller 120, which is connected to the power supply 130. The RC circuit 110 includes a resistor R1 and a capacitor C1, and is connected between the controller 120 and the switch SW1. For example, the resistor R1 of the RC circuit 110 may be connected to a lead, such as a GPIO pin 122, of the controller 120. In this example, the use of the GPIO pin 122 allows the controller 120 to interact with the RC circuit and the switch SW1, through a single lead. The capacitor C1 of the RC circuit 110 is connected in parallel to the switch SW1.

The controller 120 can be a microcontroller, microprocessor, field programmable gate array (FPGA), application specific integrated circuit (ASIC) or other processing or control system. The controller 120 may include an internal memory 124 or may be connected to an external memory (not shown) for storing data and computer executable program or code. In one example, the computer executable program or code, when executed by the controller 120, controls certain operations or functions of the electronic device 10, such as the contact wetting function, load protection function or other operations of the electronic device 10.

For example, the controller 120 is configured to supply a first voltage to the RC circuit 110 by drawing power from the power supply 130; to allow a wetting current for the dry contacts of the switch SW1 to be produced from a second voltage supplied from the capacitor C1 of the RC circuit 110; to sense a state of the switch SW1; and to perform or control other functions or operations of the electronic device 10, including those performed through the protection and/or other circuitry 140. If the electronic device 10 is a load protection device (e.g., a circuit breaker or motor overload relay), the circuitry 140 may provide for load protection under the control of the controller 120.

The power supply 130 supplies operating power to the various components of the electronic device 10. The power supply 130 may include an energy harvesting system, such as a current transformer (CT), which is able to inductively generate operating current from a current carrying conductor connected between a power line and a load. The operating current also serves as a measurement signal, which reflects current levels on the conductor connected to the load. If the electronic device 10 is a load protection device, the controller 120 may utilize the measurement signal as part of the load protection function. For example, if the measurement signal exceeds a current threshold (e.g., reflects abnormal operating conditions), the controller 120 may issue a trip command to the circuitry 140 (e.g., a trip mechanism), which interrupts the flow of current to the load.

Figure 2:
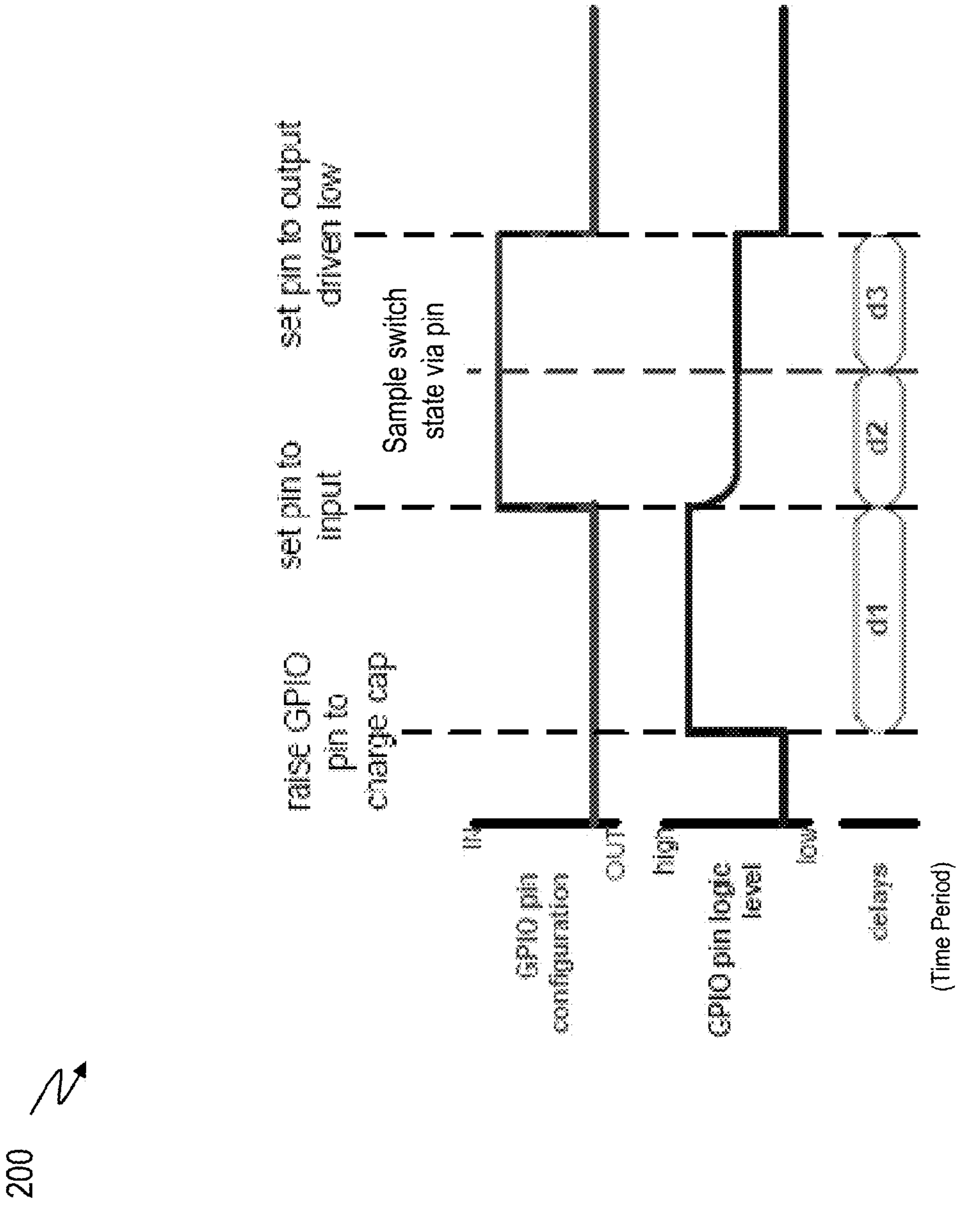
FIG. 2 illustrates a timing diagram of a switch reading process implemented by the components, such as a controller, of the electronic device of FIG. 1.

FIG. 2 illustrates a timing diagram 200 of a switch reading process implemented by an electronic device, such as the electronic device 10 in FIG. 1. For example, as shown in FIG. 2, the controller 120 initiates the process by configuring the GPIO pin 122 as an output, and then outputs a high logic level (e.g., 2 volt or 5 volt) to supply a first voltage to the RC circuit 110 during a first time period (e.g., delay D1). During the first time period, the first voltage produces a charging current across the RC circuit 110 to charge the capacitor C1 of the RC circuit 110. After the first time period, the controller 120 configures the GPIO pin 122 as an input. The first time period is preferably at least of a minimum duration to charge the capacitor C1 so that the capacitor C1, when charged, is able to produce a second voltage that is at or above a voltage, which is considered a high logic level input by the controller 120.

By configuring the GPIO pin 122 as an input, the controller 120 stops the supply of the first voltage to the RC circuit 110 after the first time period or sufficient capacitor charging. The controller 120 allows the capacitor C1, which is now charged, to supply a second voltage across the switch SW1 during a second time period (e.g., delay D2). The second voltage is used to produce a wetting current for the switch SW1. The capacitor C1 may already be available to provide wetting current during the charging time period (e.g., the first time period) if the capacitor C1 is sufficiently charged. After the second time period, the controller 120 senses the state of the switch SW1, via the GPIO pin 122, any time during a third time period (e.g., delay D3). The second time period has a maximum duration that is preferably insufficient for the capacitor C1 to discharge, through intrinsic leakage and the leakage current of the GPIO pin 122, to below the high logic level input voltage of the controller 120.

Figure 3:
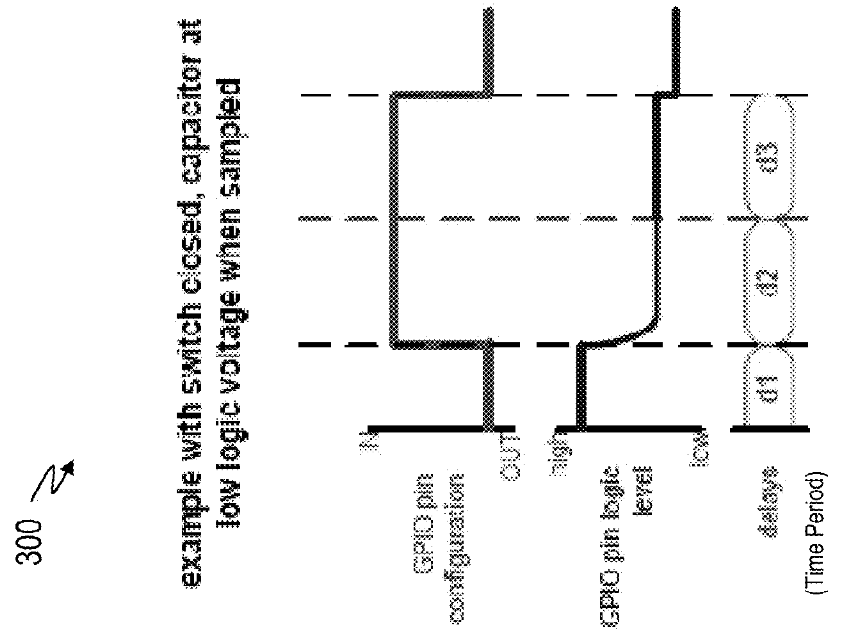
FIG. 3 illustrates a timing diagram according to FIG. 2, in which the switch is in the ON or in the closed position.
Figure 4:
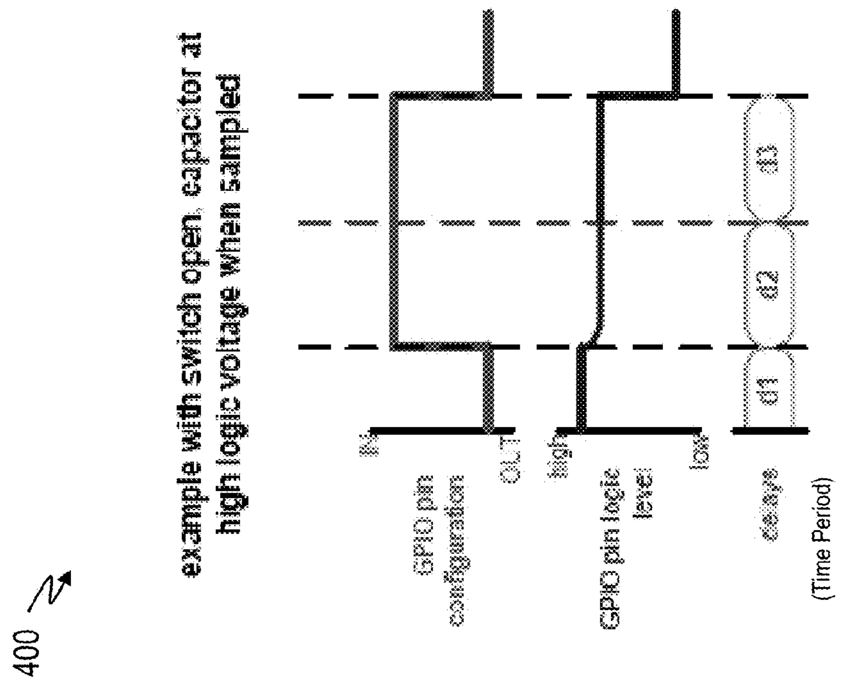
FIG. 4 illustrates a timing diagram according to FIG. 2, in which the switch is in the OFF or in the open position.

As shown in an exemplary timing diagram 300 of FIG. 3, the GPIO pin 122 of the controller 120 is sensing a signal, e.g., a low logic level, corresponding to a state of the switch SW1 in the ON or in the closed position during the third time period (e.g., delay D3). FIG. 4 shows an exemplary timing diagram 400 in which the GPIO pin 122 of the controller 120 senses a signal, e.g., a high logic level, corresponding to the switch SW1 in the OFF or in the open position during the third time period. The input logic levels shown in FIGS. 3 and 4 are exemplary logic levels representing the ON or OFF state of the switch SW1, respectively. Turning back to FIG. 2, after the third time period, the controller 120 may configure the GPIO pin 122 as an output, which is then driven to a low logic level. By driving the GPIO pin 122 to output a low logic level, it is possible to further reduce current consumption by the switching circuitry of the electronic device 10, which is particularly beneficial in low-power or self-powered applications.

Figure 5:
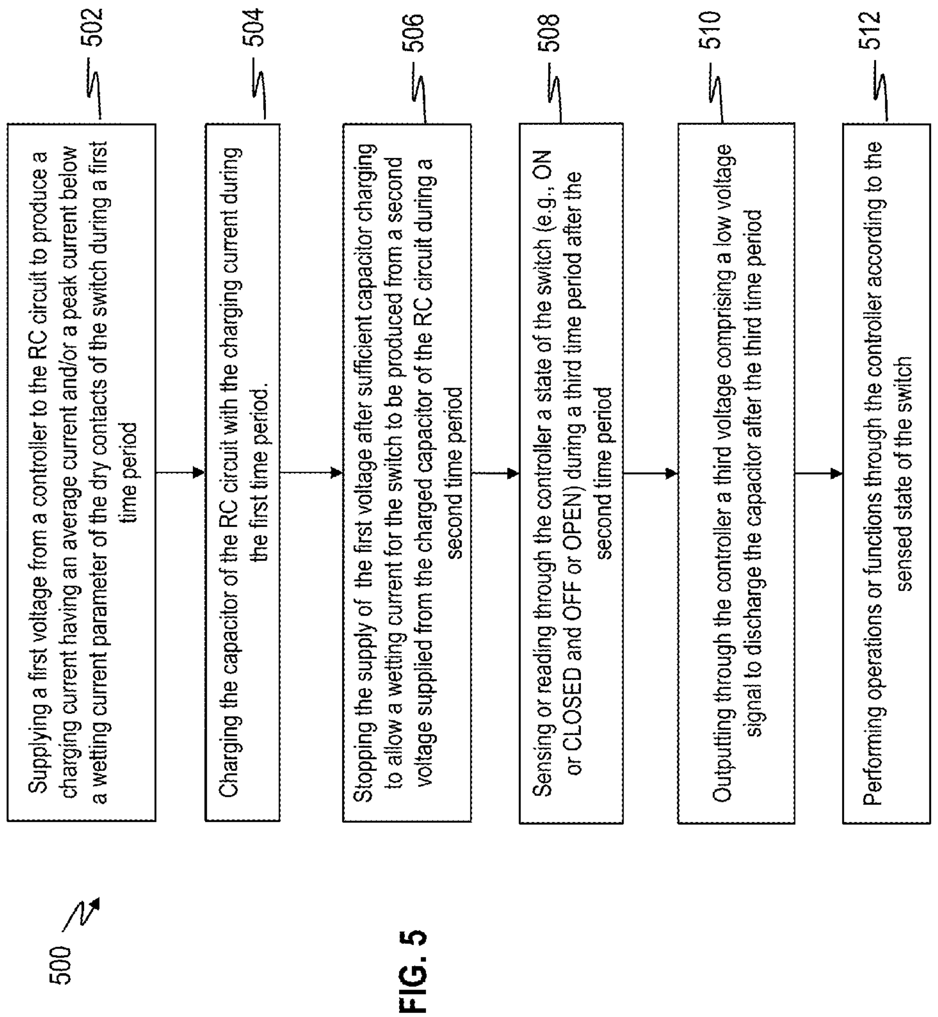
FIG. 5 illustrates an exemplary flow diagram of a process by which a state of the dry contacts of a switch, such as in FIG. 1, is sensed.

FIG. 5 illustrates an exemplary flow diagram of a process 500 by which a state of the dry contacts of a switch is sensed. For the purpose of explanation, the process 500 will be described below with reference to the components of the electronic device 10 of FIG. 1.

At reference 502, the controller 120 supplies a first voltage to the RC circuit 110 to produce a charging current having an average current and/or a peak current below a wetting current parameter of the dry contacts of the switch SW1 during a first time period. The level or amount of the charging current can be controlled based on a combination of the resistance of the RC circuit 110, e.g., the resistance of the Resistor R1, and the first voltage supplied by the controller 120. At reference 504, the capacitor C1 of the RC circuit 110 is charged with the charging current during the first time period.

At reference 506, the controller 120 stops the supply of the first voltage after sufficient capacitor charging to allow a wetting current for the dry contacts of the switch SW1 to be produced from a second voltage supplied from the charged capacitor C1 of the RC circuit 110 during a second time period. As previously discussed, the capacitor C1 may already be available to provide wetting current during the charging time period (e.g., the first time period) if the capacitor C1 is sufficiently charged. At reference 508, the controller 120 senses a state of the switch (e.g., ON or CLOSED and OFF or OPEN), during a third time period after the second time period. After the third time period, the controller 120 outputs a third voltage to the RC circuit 110, e.g., a low voltage or logic signal, to discharge the capacitor C1, at reference 510. At reference 512, the controller 120 may perform operations or functions according to the sensed state of the switch SW1. As previously discussed, the function can include, among other things, load protection.

The exemplary contact wetting circuit is described in FIG. 1 with an exemplary R-C circuit for use in accumulating energy to limit average and/or peak power consumption over time, and using the accumulated energy to produce a wetting current for a switch. Circuit configurations, other than the RC circuit of FIG. 1, may also be used to accumulate energy and produce a wetting current in accordance with the contact wetting circuit and method of the present disclosure. For example, these circuit configurations can include resistor(s), capacitor(s) or other electronic elements or combinations thereof to limit the charging current and to store energy over a period of time for use in supplying a wetting current. Furthermore, the electronic device may also include protective circuitry, such as a diode, which can be connected across the lead(s) of the controller to protect the controller against floating voltages.

Furthermore, although the exemplary controller of FIG. 1 employs a single lead for input and output, e.g., a GPIO pin, to interact with the RC circuit and the switch, the controller may be configured, at some expense, to use separate leads for input and output when interacting with the RC circuit and the switch.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A contact wetting circuit for supplying wetting current to dry contacts of a switch for an electronic device, comprising:

a controller connected to a power supply and to an RC circuit which is connected to the switch, the controller configured to:

supply a first voltage to the RC circuit to produce a charging current having an average current below or a peak current below a wetting current parameter of the dry contacts of the switch, the wetting current parameter defining a minimum current that is necessary for cleaning surface oxidation on the dry contacts of the switch to be conductive, the power supply providing to the controller the average current below or peak current below the wetting current parameter of the dry contacts of the switch, the charging current charging a capacitor of the RC circuit during a first time period; and stop the supply of the first voltage to the RC circuit after sufficient capacitor charging to allow a wetting current for the dry contacts of the switch to be transmitted from the capacitor to the switch, the wetting current produced from a second voltage supplied from the charged capacitor of the RC circuit during a second time period.

2. The circuit of claim 1, further comprising the RC circuit including a resistor and the capacitor, wherein the capacitor is connected in parallel to the switch and the resistor is connected to the controller.

3. The circuit of claim 1, wherein the controller is further configured to sense a state of the switch after the second time period.

4. The circuit of claim 3, wherein the controller includes a general input output pin (GPIO) through which to supply the first voltage during the first time period and to sense the state of the switch during a third time period after the second time period.

5. The circuit of claim 3, wherein the controller is further configured to output a third voltage comprising a low logic level after a third time period.

6. The circuit of claim 1, wherein the first voltage corresponds to a high logic level of the controller.

7. The circuit of claim 1, wherein an amount of the charging current is controlled according to the first voltage supplied from the controller and a resistance of a resistor of the RC circuit.

8. The circuit of claim 1, wherein the power supply is from the electronic device, which is a low powered or self-powered electronic device.

9. The circuit of claim 1, wherein the second voltage supplied from the capacitor has a voltage corresponding to a high logic level of the controller.

10. The circuit of claim 1, wherein the second time period has a maximum duration that is insufficient for the capacitor to discharge through current leakage, to below the second voltage.

11. A contact wetting method of supplying wetting current to dry contacts of switch for an electronic device via an RC circuit and a controller connected to a power supply, comprising:

supplying a first voltage from the controller to the RC circuit to produce a charging current during a first time period, the charging current having an average current below or a peak current below a wetting current parameter of the dry contacts of the switch, the wetting current parameter defining a minimum current that is necessary for cleaning surface oxidation on the dry contacts of the switch to be conductive, the power supply providing to the controller the average current below or peak current below the wetting current parameter of the dry contacts of the switch, the charging current further charging a capacitor of the RC circuit during the first time period; and stopping the supply of the first voltage to the RC circuit after sufficient capacitor charging to allow a wetting current to be transmitted from the capacitor to the switch, the wetting current produced for the dry contacts of the switch from a second voltage supplied from the charged capacitor of the RC circuit during a second time period.

12. The method of claim 11, further comprising sensing through the controller a state of the switch during a third time period after the second time period.

13. The method of claim 12, wherein sensing and supplying are performed by the controller via a general input output pin (GPIO) of the controller.

14. The method of claim 12, further comprising outputting, via the controller, a third voltage comprising a low logic level after a third time period.

15. The method of claim 11, wherein the first voltage corresponds to a high logic level of the controller.

16. The method of claim 11, wherein the charging current is based on the first voltage supplied from the controller and a resistance of a resistor of the RC circuit.

17. The method of claim 11, wherein the power supply is from the electronic device, which is a low powered or self-powered electronic device.

18. The method of claim 11, wherein the second voltage supplied from the capacitor has a voltage corresponding to a high logic level of the controller.

19. The method of claim 11, wherein the second time period has a maximum duration that is insufficient for the capacitor to discharge through current leakage, to below the second voltage.

20. A contact wetting method of supplying wetting current to sense the state of a pair of dry contacts of a switch for an electronic device, comprising:

producing a charging current to charge a capacitor over a time period using power drawn from a power supply for self-power of the electronic device, the charging current having an average current below or a peak current below a wetting current parameter of the dry contacts, the wetting current parameter defining a minimum current that is necessary for cleaning surface oxidation on the dry contacts of the switch to be conductive, the power supply providing the average current below or peak current below the wetting current parameter of the dry contacts of the switch;

stopping the production of the charging current;

producing a wetting current for wetting the dry contacts using power supplied from the charged capacitor, the wetting current transmitted from the capacitor to the switch; and sensing an ON or CLOSED state and an OFF or OPEN state of the switch during producing of the wetting current.

* * * * *